(12) United States Patent
Park

(10) Patent No.: US 7,341,136 B2
(45) Date of Patent: Mar. 11, 2008

(54) HYDRAULIC FLUID PLENUM PLATE ASSEMBLY

(75) Inventor: Jungho Park, Ann Arbor, MI (US)

(73) Assignee: Torque-Traction Technologies, LLC., Maumee, OH (US)

( * ) Notice: Subject to any disclaimer, the term of this patent is extended or adjusted under 35 U.S.C. 154(b) by 242 days.

(21) Appl. No.: 11/210,774

(22) Filed: Aug. 25, 2005

(65) Prior Publication Data

US 2007/0045078 A1    Mar. 1, 2007

(51) Int. Cl.
*F16D 25/02* (2006.01)
*F16H 48/22* (2006.01)

(52) U.S. Cl. .............................. 192/85 AA; 192/103 F; 475/88

(58) Field of Classification Search ............ 192/103 F; 475/88
See application file for complete search history.

(56) References Cited

U.S. PATENT DOCUMENTS

| | | | |
|---|---|---|---|
| 3,040,600 A | 6/1962 | Mueller | |
| 3,490,312 A | 1/1970 | Seitz et al. | |
| 4,452,100 A | 6/1984 | Sullivan et al. | |
| 5,127,287 A | 7/1992 | Taniguchi et al. | |
| 5,540,300 A | 7/1996 | Downs et al. | |
| 5,827,145 A | 10/1998 | Okcuoglu | |
| 5,839,327 A | 11/1998 | Gage | |
| 5,927,384 A | 7/1999 | Waldner, Jr. | |
| 6,056,658 A * | 5/2000 | Illmeier | 475/88 |
| 6,238,315 B1 * | 5/2001 | Morse et al. | 475/88 |
| 6,280,613 B1 * | 8/2001 | Morse et al. | 210/167.02 |
| 6,607,062 B1 | 8/2003 | Heatwole et al. | |
| 6,843,747 B1 | 1/2005 | Phanco et al. | |
| 7,063,198 B2 * | 6/2006 | Fratta et al. | 192/85 AA |

* cited by examiner

*Primary Examiner*—Richard M Lorence
(74) *Attorney, Agent, or Firm*—Berenato, White & Stavish

(57) ABSTRACT

A hydraulic fluid plenum plate assembly in a torque-coupling assembly, non-rotatably mounted to a rotatable coupling case thereof so as to form a plenum chamber between the plenum plate assembly and the coupling case. The coupling case has an inlet port fluidly connecting the plenum chamber with a hydraulic pump disposed within the coupling case. The plenum plate assembly comprises a pickup tube for supplying a hydraulic fluid from a fluid reservoir to the plenum chamber. The pickup tube has inlet and outlet ends. The inlet end has an inlet opening submerged in the hydraulic fluid in the fluid reservoir. The outlet end has an outlet opening fluidly connecting the pickup tube with the plenum chamber. The outlet opening is disposed above the inlet port in the coupling case at any angular position of the coupling case relative to the plenum plate assembly.

20 Claims, 6 Drawing Sheets

HYDRAULIC FLUID PLENUM PLATE ASSEMBLY

BACKGROUND OF THE INVENTION

1. Field of the Invention

The present invention relates to torque coupling assemblies in general, and more particularly to a hydraulic fluid plenum plate assembly in a hydraulically actuated torque coupling assembly for providing hydraulic fluid from a hydraulic fluid reservoir to a hydraulic fluid pump of the torque coupling assembly.

2. Description of the Prior Art

Many hydraulically actuated torque coupling assemblies, such as motor vehicle limited slip differentials, employ an internal hydraulic pump to convert the spin speed difference between one of output shafts and a differential case to a hydraulic pressure that actuates a piston actuator, which in turn activates a multi-plate friction clutch assembly. As illustrated in FIG. 1, a pickup tube 110 draws a hydraulic fluid from an axle sump by a vacuum generated by the hydraulic pump and transports the hydraulic fluid to a hydraulic plenum chamber 112 disposed between a plenum plate 114 and the differential case 116 adjacent to the hydraulic pump through an inlet port 118 fluidly connecting the plenum chamber 112 with the hydraulic pump. An inlet end of the pickup tube 110 is provided with an inlet opening 120 submerged in the hydraulic lubricant fluid in the axle sump, while an outlet end of the pickup tube 110 is provided with an outlet opening 122 through the plenum plate 114 fluidly connecting the pickup tube 110 with the plenum chamber 112. An outlet port through which the hydraulic fluid exits the differential case 12 is depicted with the reference numeral 126.

As shown in FIG. 1, the outlet opening 122 of the prior pickup tube 110 is positioned at the middle height of the plenum chamber 112. In other words, a fluid level 124 in the plenum chamber 112 is substantially lower of the inlet port 118 of the hydraulic pump at an uppermost angular position thereof relative to a central axis 126. As the differential case 116 rotates, the inlet port 118 of the hydraulic pump is positioned in and out of the hydraulic fluid in the plenum chamber 112. As a result, air bubbles could be sucked in through the inlet port 118 and entrapped into the hydraulic pump and the piston actuator. In addition, it would take a time for the plenum chamber 112 to be fully filled with the hydraulic fluid by the continued pumping action of the hydraulic pump. In other words, the prior art plenum chamber arrangement poses the problem of air bubble entrapment and the time delay.

Therefore, the hydraulically actuated torque coupling assemblies of the prior art having plenum chambers, including but not limited to those discussed above, are susceptible to improvements that may enhance their performance and cost. With this in mind, a need exists to develop an improved hydraulically actuated torque coupling assembly that is compact in size, can be packaged into existing torque coupling assemblies, and greatly reduces the air bubble entrapment and the time delay problems, thus advancing the art.

SUMMARY OF THE INVENTION

The present invention provides a novel hydraulic fluid plenum plate assembly in a torque-coupling assembly. The plenum plate assembly of the present invention is non-rotatably mounted to a rotatable coupling case of the torque-coupling assembly so as to form a plenum chamber between the plenum plate assembly and the coupling case. The coupling case includes at least one inlet port fluidly connecting the plenum chamber with a hydraulic pump disposed within the coupling case.

The hydraulic fluid plenum plate assembly in accordance with the present invention comprises a hydraulic fluid pickup tube for supplying a hydraulic fluid from a hydraulic fluid reservoir to the plenum chamber. The hydraulic fluid pickup tube has an inlet end and an outlet end. The inlet end of the pickup tube has an inlet opening submerged in the hydraulic fluid in the hydraulic fluid reservoir. The outlet end of the pickup tube has an outlet opening fluidly connecting the pickup tube with the plenum chamber. The outlet opening of the pickup tube is disposed above the at least one inlet port in the coupling case at any angular position of the coupling case relative to the plenum plate assembly.

Such an arrangement of the plenum plate assembly effectively reduces air bubble entrapment and time delay problems, commonly occurred in the prior art, when the hydraulic fluid pump starts generating pressurized hydraulic fluid. Other advantages and novel features of the present invention will become apparent in the following detailed description of the invention when considered in conjunction with the accompanying drawings.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

Figure 1:
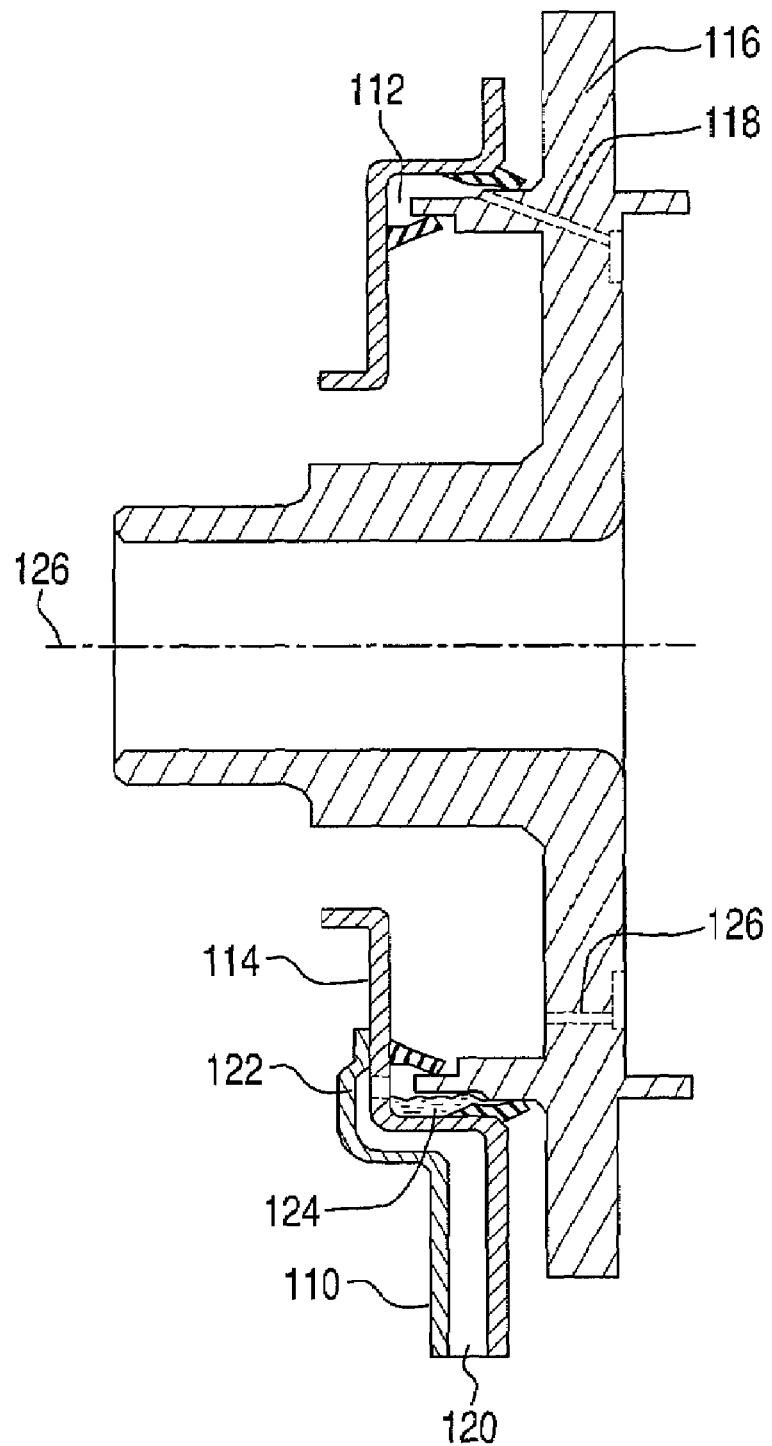
FIG. 1 is an enlarged cross-sectional view of a hydraulic fluid plenum plate assembly of the prior art mounted to a differential case of a limited slip differential assembly.

The preferred embodiment of the present invention will now be described with the reference to accompanying drawings.

For purposes of the following description, certain terminology is used in the following description for convenience only and is not limiting. The words "right," "left," "lower," and "upper" designate directions in the drawings to which reference is made. The words "uppermost" and "lowermost"

refer to position in a vertical direction relative to a geometric center of the apparatus of the present invention and designated parts thereof. The terminology includes the words above specifically mentioned, derivatives thereof and words of similar import. Additionally, the word "a," as used in the claims, means "at least one."

Figure 2:
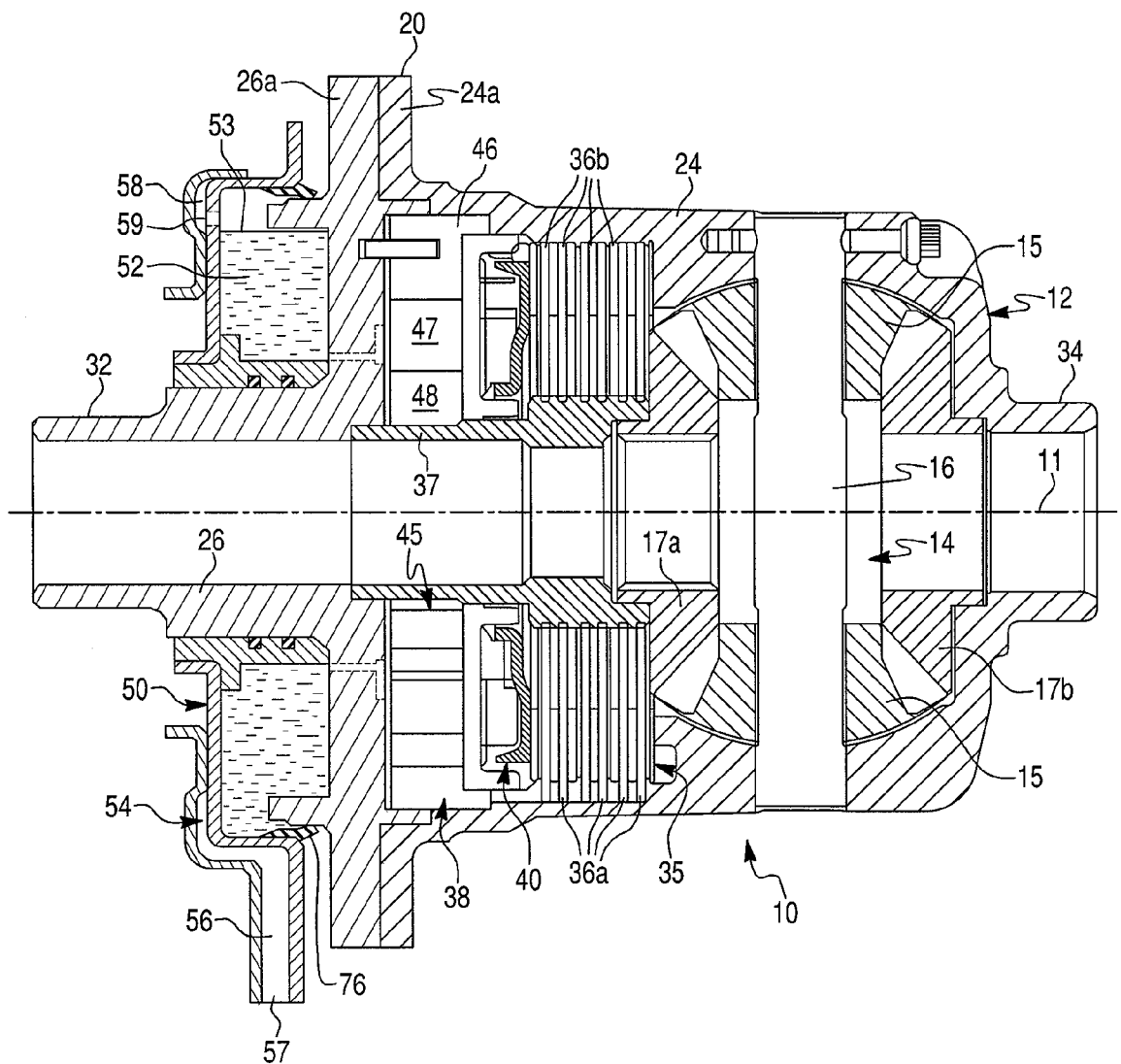
FIG. 2 is a cross-sectional view of a limited slip differential assembly with a hydraulic fluid plenum plate assembly in accordance with a preferred embodiment of the present invention.
Figure 3:
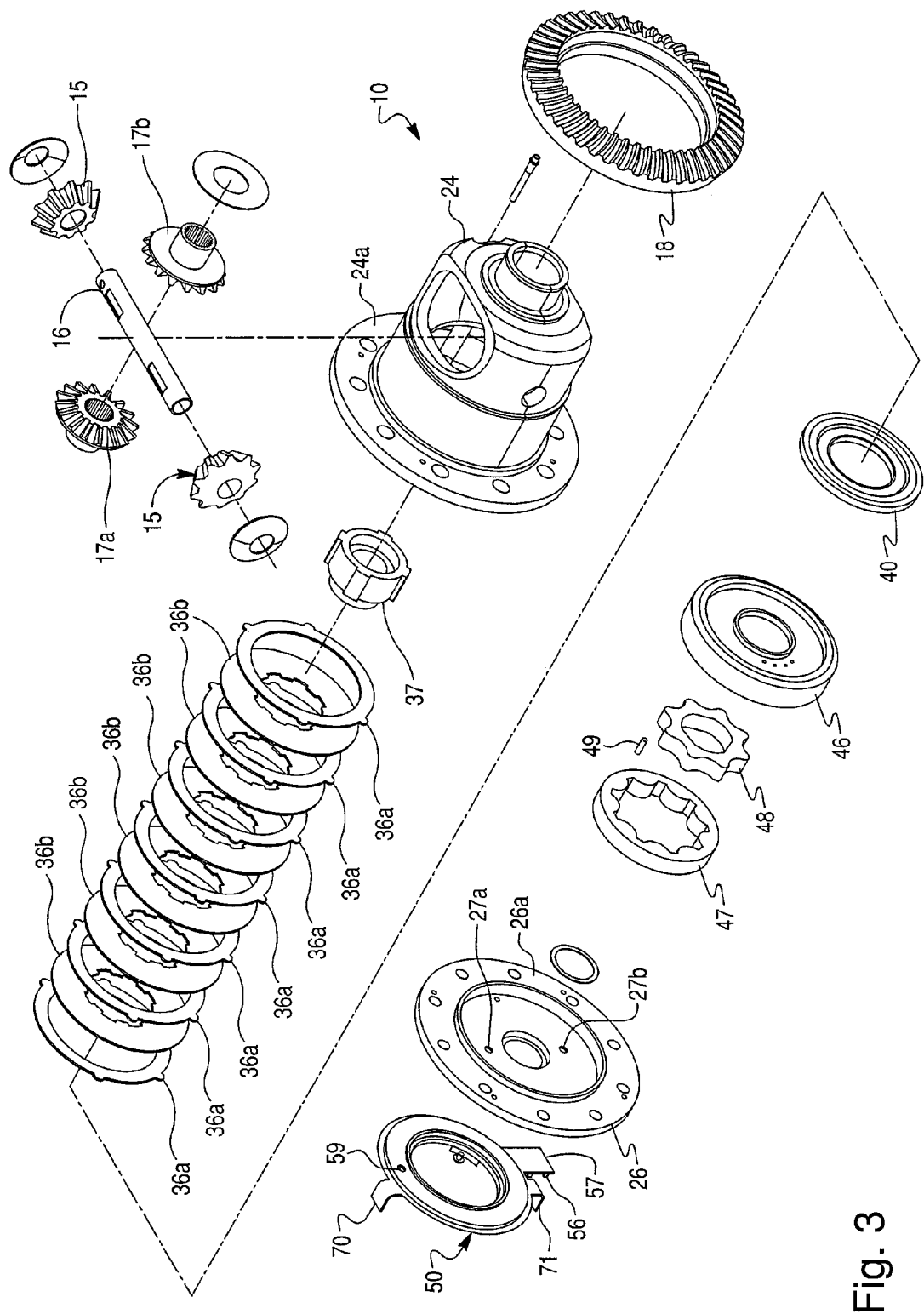
FIG. 3 is an exploded perspective view of the differential assembly of the preferred embodiment of the present invention.

The present invention is directed to a hydraulically actuated torque coupling assembly including a hydraulic fluid pump, such as a hydraulically controlled limited slip differential (LSD) assembly indicated generally at 10 in FIGS. 2 and 3 that illustrate the preferred embodiment of the present invention. The limited slip differential assembly 10 of the present invention comprises a differential case 12 which includes a case member 24 and a side cover member 26 each provided with a complementary annular flange 24a and 26a, respectively. The flanges 24a and 26a of the differential case member 24 and side cover member 26 are fastened to each other by any appropriate means known in the art, such as threaded fasteners, to form a generally cylindrical structure. It will be appreciated that the hydraulically actuated torque coupling assembly of the present invention may be in any appropriate form other than the limited slip differential assembly, such as hydraulically actuated shaft coupling, auxiliary axle coupling for a motor vehicle, a power take-off coupling of a front-wheel-drive transaxle, etc.

The differential case 12 also includes hollow receiving hubs (trunnions) 32 and 34 on each end thereof. The hubs 32 and 34 define apertures for receiving opposite output shafts (not shown). The differential case 12 is rotatably supported in a differential housing 22 (shown only schematically in FIG. 7) for rotation about a central axis 11 through differential bearings (not shown) mounted about the hubs 32 and 34. The differential housing 22 forms a differential chamber 28 containing a supply of a hydraulic lubricant fluid 29, thus defining a hydraulic fluid reservoir. A level of the lubricant fluid 29 in the differential chamber 28 is depicted by the reference numeral 30. The juxtaposed flanges 24a and 26a of the differential case 12 define a flange 20 of the differential case 12. The ring gear 18 (shown in FIG. 3) is bolted or otherwise secured to the flange 20 of the differential case 12 coaxially to the central axis 11.

The differential case 12 houses a planetary differential gear mechanism 14 provided with a set of pinion gears 15 rotatably supported on a pinion shaft 16 secured to the differential case 12 such that the pinion gears 15 rotate with the case 12 around the axis 11. The pinion gears 15 are also adapted to rotate around the pinion shaft 16. A pair of opposite side gears 17a and 17b are axially aligned and rotatably disposed within the differential case 12 to rotate about the axis 11. The side gears 17a and 17b are splined to the opposite output axle shafts. The side gears 17a and 17b engage the pinion gears 15 such that differential rotation can be effected between the differential case 12 and the side gears 17a and 17b, hence the output shafts.

The differential case 12 is driven from a source of rotary power (not shown). The output shafts are drivingly connected to a pair of wheels mounted in a well-known manner on an axle of a vehicle (also not shown). The two output axle shafts are driven by the differential case 12 by way of the differential gear assembly 14 which distributes driving torque between the two output shafts, as is well-known in the art.

In addition, between the differential case 12 and the side gear 17a there is provided a hydraulic coupling which is responsive to differences in rotations between the side gears 17a and 17b. The hydraulic coupling comprises a clutch assembly 35 and an actuator assembly 38 operably arranged to actuate the clutch assembly 35 for automatically and progressively transferring drive torque from the faster rotating axle shaft to the slower rotating axle shaft in response to excessive speed differentiation therebetween. The actuator assembly 38 includes a piston assembly 40 and a hydraulic fluid pump 45. Preferably, the clutch assembly 35 is a hydraulically actuated multi-plate friction clutch assembly. However, other appropriate types of hydraulically actuated clutches are within the scope of the present invention. Both the actuator assembly 38 and the clutch assembly 35 are disposed within the differential case 12.

In accordance with the preferred embodiment of the present invention illustrated in detail in FIGS. 2 and 3, the hydraulically actuated multi-plate friction clutch assembly 35 is provided within the differential case 12. The multi-plate friction clutch assembly 35, well known in the prior art, includes sets of alternating outer friction discs 36a and inner friction 20 discs 36b. Conventionally, an outer circumference of the outer friction discs 36a is provided with projections that non-rotatably engages corresponding grooves formed in the differential case 12. At the same time, the outer friction discs 36a are slideable in axial direction. The inner friction discs 36b are splined to a clutch sleeve 37 for rotation therewith. The clutch sleeve 37 and the side gear 17a are drivingly coupled to the output shaft, preferably via a splined connection. In other words, the clutch sleeve 37 is drivingly (non-rotatably) coupled to the side gear 17a.

The clutch plates 36a frictionally engage the clutch plates 36b to form a torque coupling arrangement between the differential case 12 and the differential gear mechanism 14 formed by the pinion gears 15 and side gears 17a, 17b. Torque is transferred from the ring gear 18 to the differential case 12, which drives the differential gear mechanism 14 through the pinion shaft 16. As described below, the hydraulic pump 45 actuates the friction clutch assembly 35 depending on the relative rotation between the differential case 12 and the clutch sleeve 37, i.e. the side gear 17b. More specifically, the speed sensitive fluid pump 45 actuates the piston assembly 40 that compresses the friction clutch assembly 35 to increase the frictional engagement between the clutch plates 36a, 36b.

Preferably, the hydraulic fluid pump 45 is in the form of a speed sensitive, bi-directional gerotor pump comprising a pump cylinder 46, an outer rotor 47 and an inner rotor 48. However, it will be appreciated that any other appropriate type of hydraulic pump generating the hydraulic pressure in response to the relative rotation between the side gear and the differential case is within the scope of the present invention. The side cover member 26 and the pump cylinder 46 form a housing for the gerotor pump 45. The inner rotor 48 mates with the clutch sleeve 37, while the pump cylinder 46 mates with the differential case 12 via retention pin 49 (see FIGS. 2 and 3). It will be appreciated that a hydraulic pressure generated by the pump 45 is substantially proportional to a rotational speed difference between the differential case 12 and the side gear 17b.

One of ordinary skill in the art would appreciate that the inner rotor 48 has one less tooth than the outer rotor 47 (as illustrated in FIG. 3) and when the inner rotor 48 is driven it will drive the outer rotor 47, which can freely rotate within the side cover member 26 and the pump cylinder 46, thus providing a series of decreasing and increasing volume fluid pockets by means of which fluid pressure is created. External to the pump itself, the inner rotor 48 is drivingly connected to the clutch sleeve 37, and the sleeve 37 meshes with the inner clutch plates 36b. When relative motion takes place between the differential case 12 and the inner rotor 48/clutch sleeve 37, the hydraulic fluid pump 45 will generate hydraulic fluid pressure.

Figure 4:
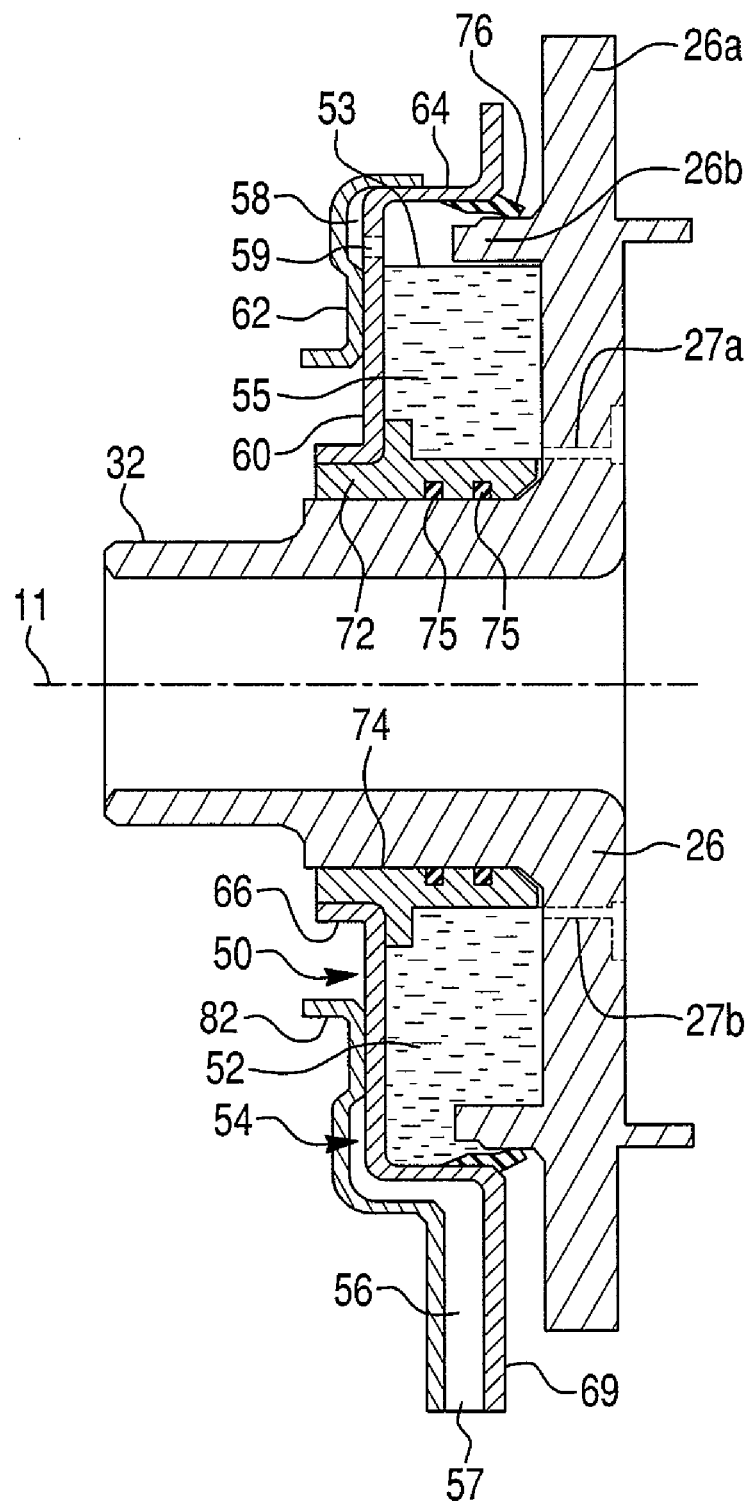
FIG. 4 is an enlarged cross-sectional view of the hydraulic fluid plenum plate assembly of the present invention mounted to a side cover member of a differential case of the limited slip differential assembly.

As shown in FIGS. 2-4, the casing side cover member 26 has at least one inlet port 27a through which the hydraulic fluid is pumped into the differential case 12 by the hydraulic fluid pump 45, and at least one outlet port 27b through which the hydraulic fluid exits the differential case 12 and into the plenum chamber 52. Preferably, the inlet port 27a is formed on a radius as close to the central axis 11 as possible so as to eliminate the centrifugal hydraulic fluid loss problem of the prior-art pump-type torque-coupling systems.

The torque coupling assembly 10 further comprises a non-rotatable hydraulic fluid plenum plate assembly 50. As illustrated in detail in FIG. 4, the plenum plate assembly 50 is rotatably mounted to the side cover member 26 of the coupling case 12 so as to form a substantially annular, fluidly sealed hydraulic plenum chamber 52 defined between the plenum plate assembly 50 and the coupling case 12.

The plenum plate assembly 50 includes a pickup tube 54 for supplying the hydraulic fluid from the hydraulic fluid reservoir 28 to the plenum chamber 52. The pickup tube 54 has an inlet end 56 and an outlet end 58. The inlet end 56 of the pickup tube 54 is provided with an inlet opening 57 submerged in the hydraulic lubricant fluid 29 in the hydraulic fluid reservoir 28. In turn, the outlet end 58 of the pickup tube 54 is provided with an outlet opening 59 fluidly connecting the pickup tube 54 with the plenum chamber 52.

Referring again to the FIGS. 4-6, the plenum plate assembly 50 includes a main plate 60 and an auxiliary plate 62 secured to the main plate 60 so as to form the pickup tube 54. The auxiliary plate 62 is secured to the main plate 60 by any appropriate means known in the art, such as by welding, brazing, adhesive bonding, etc., to form a continuous bond or seal between the main plate 60 and the auxiliary plate 62 and thus create the pickup tube 54 therebetween. Preferably, the main plate 60 and the auxiliary plate 62 are fabricated by stamping. It will be appreciated that a simple, two-piece part design of the hydraulic fluid plenum plate assembly 50 in accordance with the present invention is easy and inexpensive in manufacturing.

The main plate 60 is substantially circular in configuration and includes an annular outer flange 64, an annular inner flange 66 defining a central opening 68 therethrough and a substantially straight and flat inlet portion 69 radially downwardly extending from the outer flange 64 of the main plate 60. The main plate 60 further includes first and second anti-rotation tabs 70 and 71, respectively. The main plate 60 is also provided with the outlet opening 59 formed therethrough.

Figure 5:
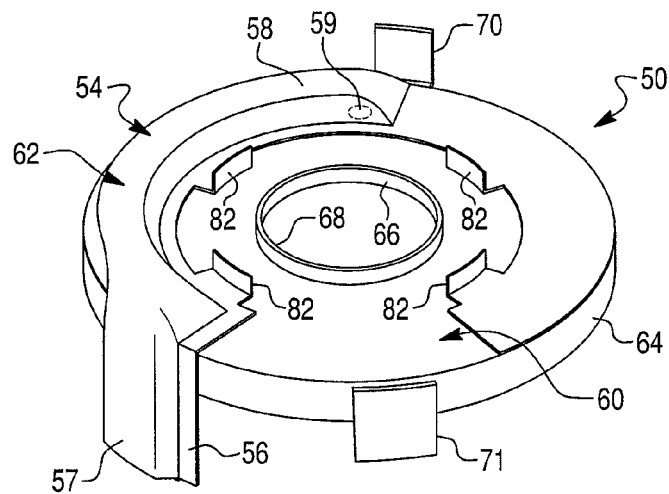
FIG. 5 is a perspective view of the hydraulic fluid plenum plate assembly in accordance with the preferred embodiment of the present invention.
Figure 6:
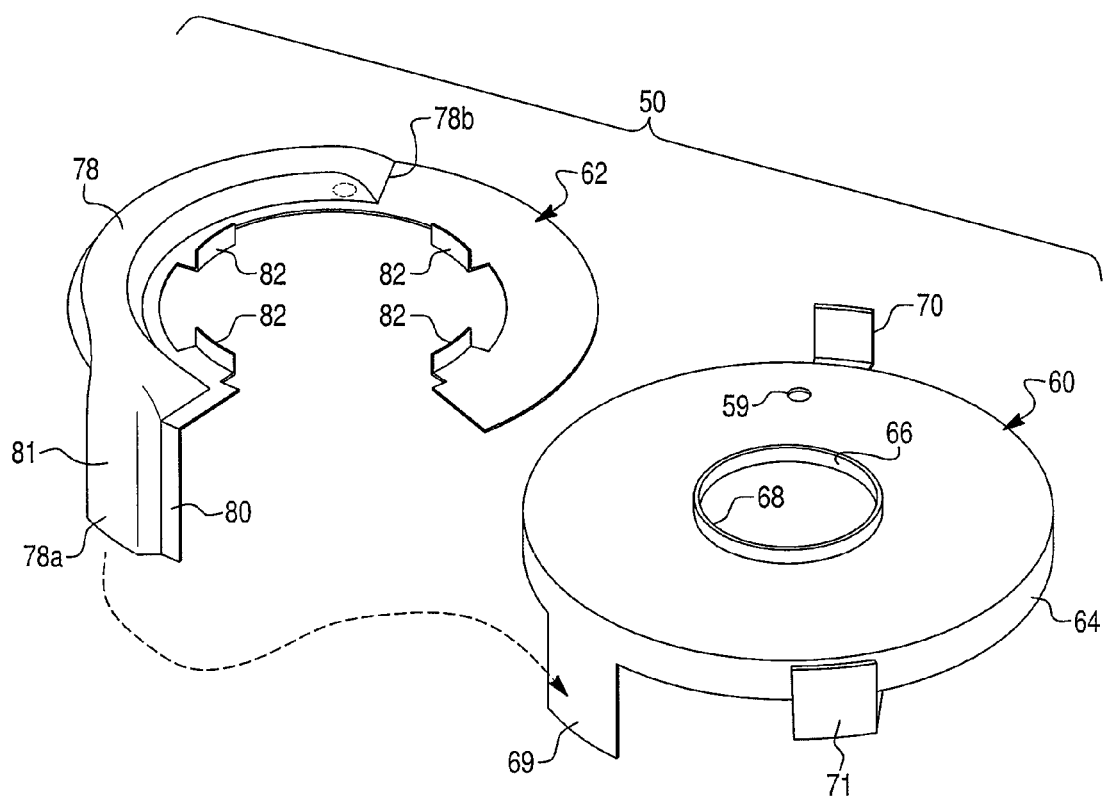
FIG. 6 is an exploded perspective view of the hydraulic fluid plenum plate assembly in accordance with the preferred embodiment of the present invention.

As illustrated in detail in FIGS. 5 and 6, the auxiliary plate 62 is curved in a plane parallel to the main plate 60 and is formed with a hydraulic fluid channel (or groove) 78 facing the main plate 60. The hydraulic fluid channel 78 is open at one end 78a and closed at the other end 78b thereof. Alternatively, the hydraulic fluid channel 78 may be formed in the main plate 60. When the auxiliary plate 62 is secured to the main plate 60, an open side of the hydraulic fluid channel 78 facing the main plate 60 is closed by the main plate 60, thus forming the pickup tube 54. The auxiliary plate 62 further includes a generally straight inlet portion 80 substantially complementary to the pickup portion 69 of the main plate 60 and axially offset therefrom, as shown in FIGS. 4-6. The inlet portion 80 is formed with a hydraulic fluid channel 81 which is a part of the hydraulic fluid channel 78 adjacent to the end 78a thereof. The auxiliary plate 62 also includes a number of retaining tabs 82 abutting a bearing race (not shown) of the adjacent differential bearing to limit the axial movement of the plenum plate assembly 50 away from the differential case 12.

When the auxiliary plate 62 is secured to the main plate 60, a portion of the pickup tube 54 formed by the inlet portions 69 and 80 of the main plate 60 and the auxiliary plate 62, respectively, defines the inlet end 56 of the pickup tube 54. As illustrated in FIGS. 4-6, the inlet end 56 of the pickup tube 54 extends radially downwardly from the main plate 60. The plenum chamber 52 is partially immersed in the hydraulic lubricant fluid 29 in the hydraulic fluid reservoir 28, while the inlet end 56 of the pickup tube 54 is at least partially immersed in the hydraulic lubricant fluid 29 in the hydraulic fluid reservoir 28, as further illustrated in FIG. 7. Hence, the inlet opening 57 of the pickup tube 54 is always submerged in the hydraulic lubricant fluid 29 in the hydraulic fluid reservoir 28.

Moreover, as illustrated in detail in FIG. 4, the LSD assembly 10 according to the preferred embodiment of the present invention is provided with an annular plastic bushing 72 non-rotatably secured to the inner flange 66 of the main plate 60. In turn, the plastic bushing 72 is rotatably mounted to the hub 32 of the differential case 12. A central bore 74 of the plastic bushing 72 is provided with one or more annular inner seals 75 in sealing contact with the hub 32 of the differential case 12. Preferably, the plastic bushing 72 is molded over the inner flange 66 of the main plate 60. The outer flange 64 axially extends from the main plate 60 toward the differential case 12 and is further provided with an annular outer lip seal 76 adapted to engage an outer peripheral surface of an annular wall 26b extending axially outwardly from the side cover member 26 of the differential case 12. Thus, the inner and outer seals 75 and 76, respectively, fluidly seal the plenum chamber 52 between the main plate 60 of the plenum plate assembly 50 and the side cover member 26 of the coupling case 12.

Figure 7:
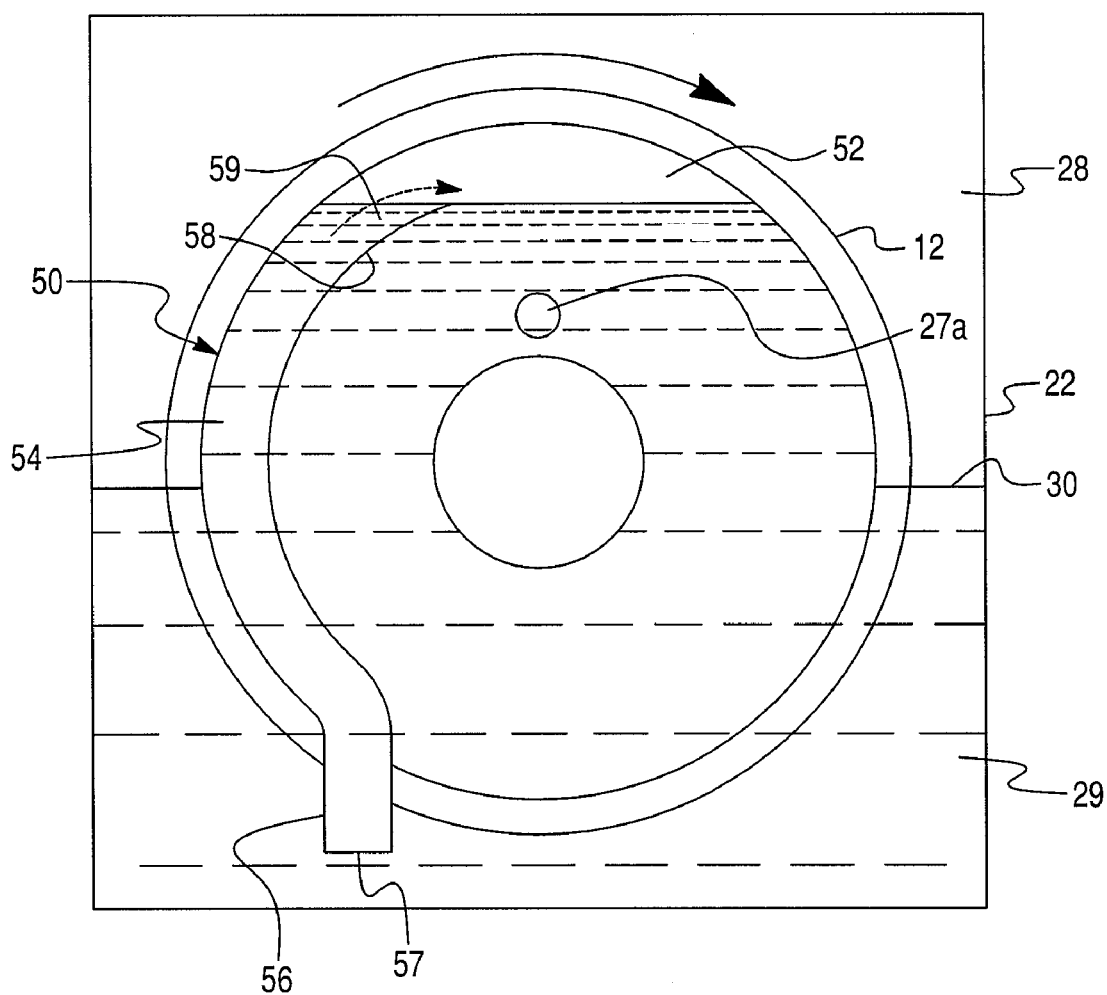
FIG. 7 is a schematic side view showing the differential assembly of the preferred embodiment of the present invention submersed in a lubricant fluid reservoir.

As further illustrated in detail in FIGS. 4 and 7, the outlet opening 59 is disposed above the inlet port 27a in the coupling case 12. More specifically, the outlet opening 59 of the pickup tube 54 is oriented so as to be disposed above the inlet port 27a in the coupling case 12 at any angular position of the coupling case 12 relative to the coupling housing 22 during the rotation. In other words, the outlet opening 59 is disposed above the inlet port 27a even at an uppermost angular position thereof relative to the central axis 11. Also, as illustrated in FIGS. 4 and 7, the outlet opening 59 is disposed almost at the top of the plenum chamber 52 and substantially above the level of the lubricant fluid 29 in the hydraulic fluid reservoir 28. Such a high location of the outlet opening 59 allows the plenum chamber 52 to constantly maintain such a high level 53 of the lubricant fluid 55 in the plenum chamber so that the inlet port 27a is always immersed in the hydraulic fluid 53 in the plenum chamber 52 even when the differential case 12 is stationary. Such an arrangement of the plenum plate assembly effectively reduces air bubble entrapment and time delay problems, commonly occurred in the prior art, when the hydraulic fluid pump starts generating pressurized hydraulic fluid.

Furthermore, the hydraulic fluid plenum plate assembly 50 in accordance with the present invention is a simple, two-piece part which is easy and inexpensive in manufacturing. The manufacturing is especially simplified because most of the complex features such as the retaining tabs 82 are featured in the auxiliary plate 62 rather than the main plate 60 which is more difficult to manufacture due to a drawing process. In other words, the main plate 60 is substantially annular in shape except the non-rotation tabs 70, 71. The ease of manufacturing can be further enhanced by moving the non-rotation tabs 70, 71 from the main plate 60 to the auxiliary plate 62.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A hydraulic fluid plenum plate assembly in a torque-coupling assembly, said plenum plate assembly rotatably mounted to a rotatable coupling case of said torque-coupling assembly so as to form a plenum chamber between said plenum plate assembly and said coupling case, said coupling case having at least one inlet port fluidly connecting said plenum chamber with a hydraulic pump disposed within said coupling case, said hydraulic fluid plenum plate assembly comprising:
   a hydraulic fluid pickup tube for supplying a hydraulic fluid from a hydraulic fluid reservoir to said plenum chamber;
   said hydraulic fluid pickup tube having an inlet end and an outlet end;
   said inlet end of said pickup tube having an inlet opening submerged in the hydraulic fluid in said hydraulic fluid reservoir;
   said outlet end of said pickup tube having an outlet opening fluidly connecting said pickup tube with said plenum chamber, said outlet opening of said pickup tube disposed above said at least one inlet port in said coupling case at any angular position of said coupling case relative to said plenum plate assembly.

2. The plenum plate assembly as defined in claim 1, further comprising a main plate rotatably mounted to said coupling case so as to form said plenum chamber between said main plate and said coupling case.

3. The plenum plate assembly as defined in claim 2, further comprising an auxiliary plate secured to said main plate for forming said hydraulic fluid pick-up tube.

4. The plenum plate assembly as defined in claim 3, wherein one of said main plate and said auxiliary plate is formed with a hydraulic fluid channel facing the other one of said main plate and said auxiliary plate; said hydraulic fluid channel is open at one end and closed at the other end thereof.

5. The plenum plate assembly as defined in claim 4, wherein said hydraulic fluid channel is curved in a plane parallel to said main plate.

6. The plenum plate assembly as defined in claim 2, wherein said outlet opening of said pickup tube is formed through said main plate.

7. The plenum plate assembly as defined in claim 2, further comprising an annular plastic bushing non-rotatably secured to said main plate of said plenum plate assembly; said main plate is rotatably mounted to said coupling case through said plastic bushing.

8. The plenum plate assembly as defined in claim 7, wherein said main plate includes an annular inner flange defining a central opening therethrough, and wherein said plastic bushing is non-rotatably secured to said inner flange of said main plate.

9. The plenum plate assembly as defined in claim 7, wherein said plastic bushing is rotatably mounted to a trunnion of said coupling case.

10. The plenum plate assembly as defined in claim 7, wherein said plastic bushing is provided with at least one annular seal in sealing contact with said coupling case to fluidly seal said plenum chamber.

11. The plenum plate assembly as defined in claim 10, wherein said at least one annular seal is in sealing contact with a trunnion of said coupling case to fluidly seal said plenum chamber.

12. The plenum plate assembly as defined in claim 2, wherein said main plate includes an annular outer flange axially extending from said main plate toward said coupling case, said outer flange is provided with at least one annular seal in sealing contact with said coupling case to fluidly seal said plenum chamber.

13. The plenum plate assembly as defined in claim 12, wherein said at least one annular seal engages an outer peripheral surface of an annular wall extending axially outwardly from said coupling case.

14. The plenum plate assembly as defined in claim 1, wherein said coupling case is rotatably supported in a coupling housing, said coupling housing is provided for storing a supply of the hydraulic fluid and defines said hydraulic fluid reservoir.

15. The plenum plate assembly as defined in claim 1, wherein said coupling case has at least one outlet port through which the hydraulic fluid exits said coupling case and into said plenum chamber.

16. A hydraulic fluid plenum plate assembly in a torque-coupling assembly, said plenum plate assembly rotatably mounted to a rotatable coupling case of said torque-coupling assembly so as to form a plenum chamber between said plenum plate assembly and said coupling case, said hydraulic fluid plenum plate assembly comprising:
   a hydraulic fluid pickup tube for supplying a hydraulic fluid from a hydraulic fluid reservoir to said plenum chamber;
   said hydraulic fluid pickup tube having an inlet end and an outlet end;
   said inlet end of said pickup tube having an inlet opening submerged in the hydraulic fluid in said hydraulic fluid reservoir;
   said outlet end having an outlet opening for fluidly connecting said pickup tube with said plenum chamber, said outlet opening being disposed substantially higher than a level of the hydraulic fluid in said hydraulic fluid reservoir when said torque-coupling assembly is stationary;
   said plenum chamber being partially immersed in the hydraulic fluid in said hydraulic fluid reservoir.

17. The plenum plate assembly as defined in claim 16, further comprising a main plate rotatably mounted to said coupling case so as to form said plenum chamber between said main plate and said coupling case; said outlet opening is formed through said main plate.

18. The plenum plate assembly as defined in claim 17, further comprising an auxiliary plate secured to said main plate for forming said hydraulic fluid pick-up tube.

19. The plenum plate assembly as defined in claim 18, wherein one of said main plate and said auxiliary plate is formed with a hydraulic fluid channel facing the other one of said main plate and said auxiliary plate; said hydraulic fluid channel is open at one end and closed at the other end thereof.

20. The plenum plate assembly as defined in claim 17, further comprising an annular plastic bushing non-rotatably secured to said main plate of said plenum plate assembly; said main plate is rotatably mounted to said coupling case through said plastic bushing.

* * * * *